United States Patent
Deluca et al.

(10) Patent No.: US 9,354,868 B2
(45) Date of Patent: *May 31, 2016

(54) INTEGRATED EXCHANGE OF DEVELOPMENT TOOL CONSOLE DATA

(71) Applicant: Snapchat, Inc., Venice, CA (US)

(72) Inventors: Lisa Seacat Deluca, San Francisco, CA (US); Bianca X. Jiang, Lexington, MA (US); Asima Silva, Westford, MA (US)

(73) Assignee: Snapchat, Inc., Venice, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/094,775

(22) Filed: Dec. 2, 2013

(65) Prior Publication Data

US 2014/0089897 A1  Mar. 27, 2014

Related U.S. Application Data

(63) Continuation of application No. 12/828,261, filed on Jun. 30, 2010, now Pat. No. 8,627,308.

(51) Int. Cl.
*G06F 9/44* (2006.01)
*G06F 11/07* (2006.01)

(52) U.S. Cl.
CPC .. *G06F 8/71* (2013.01); *G06F 8/30* (2013.01); *G06F 11/079* (2013.01); *G06F 11/0769* (2013.01); *G06F 11/0784* (2013.01)

(58) Field of Classification Search
CPC . G06F 11/3664; G06F 11/362; G06F 11/368; G06F 8/71; G06F 9/44536; G06F 17/2288; G06F 8/34; G06F 3/04842
See application file for complete search history.

(56) References Cited

U.S. PATENT DOCUMENTS 6,502,234 B1 * 12/2002 Gauthier ............... G06F 8/34
                                                         717/101
7,013,458 B2    3/2006 Bloch et al.
(Continued)

OTHER PUBLICATIONS

Marcelo Jabali, The Message: Calling Web Services with Apache Camel, Jul. 8, 2011, retrieved online on Dec. 2, 2015, pp. 1-12. Retrieved from the Internet: <URL: http://marcelojabali.blogspot.com/2011/07/calling-web-services-with-apache-camel.html>.*

(Continued)

*Primary Examiner* — Thuy Dao
*Assistant Examiner* — Hanh T Bui
(74) *Attorney, Agent, or Firm* — Schwegman Lundberg & Woessner, P.A.

(57) ABSTRACT

Embodiments of the present invention provide a method, system and computer program product for exchanging console data in a messaging system. In an embodiment of the invention, a method for exchanging console data in a messaging system includes receiving a message in a messaging client executing in memory by at least one processor of a computer. The method further includes selecting in the message in the messaging client a portion of console data for a version of source code. For instance, the console data can be a selection of source code or an error message for a selection of source code. Finally, in response to the selection of the portion of console data, corresponding meta-data for the message can be extracted and a version of source code for the console data can be determined from the meta-data. Finally, the version of the source code can be loaded in an IDE executing in the memory by the at least one processor of the computer.

12 Claims, 2 Drawing Sheets

(56) References Cited

U.S. PATENT DOCUMENTS

| | | |
|---|---|---|
| 7,039,833 B2 | 5/2006 | Knuutila et al. |
| 7,584,458 B2 | 9/2009 | Das et al. |
| 7,607,124 B2 | 10/2009 | Gooty et al. |
| 8,015,546 B2 * | 9/2011 | Jones ................ G06F 8/34 715/762 |
| 8,688,676 B2 * | 4/2014 | Rush ................ G06F 8/36 707/706 |
| 2004/0078689 A1 * | 4/2004 | Knuutila ........ G06F 11/0709 714/38.1 |
| 2005/0229159 A1 * | 10/2005 | Haba et al. ............... 717/122 |
| 2007/0150959 A1 * | 6/2007 | Ahdout et al. ............ 726/26 |
| 2009/0013248 A1 | 1/2009 | Hutchison et al. |
| 2009/0172636 A1 * | 7/2009 | Griffith ............ G06F 11/3664 717/113 |

OTHER PUBLICATIONS

Andrew Harrison and Ian Taylor, Web Enabling Desktop Workflow Applications, ACM, 2009, retrieved online on Dec. 2, 2015, pp. 1-9. Retrieved from the Internet: <URL: http://delivery.acm.org/10.1145/1650000/1645169/a5-harrison.pdf?>.*

* cited by examiner

INTEGRATED EXCHANGE OF DEVELOPMENT TOOL CONSOLE DATA

CROSS-REFERENCE TO RELATED APPLICATIONS

This application is a Continuation of U.S. application Ser. No. 12/828,261, filed Jun. 30, 2012, now U.S. Pat. No. 8,627,308, the entirety of which is incorporated herein by reference.

BACKGROUND OF THE INVENTION

1. Field of the Invention

The present invention relates to collaborative software development and more particularly to console data exchange between developers in a collaborative software development environment.

2. Description of the Related Art

Software development has evolved from the primitive specification of program code on punch cards to a source code file driven compilation and build workflow. Early, simplistic software development projects involved a single developer coding to a specification on a single development computer using a text editor to access a source code file and separate compile and build programs processing the source code file into an executable binary. As the complexity of the computer program grew in parallel to the growth of computing power, software development evolved into a multi-developer endeavor requiring sophisticated source code management and debugging tools to corral and coordinate the efforts of the developers.

Principal to the modern software development workflow is the integrated development environment (IDE). Initially introduced as the primary user interface to a particular coding language such as the venerable PASCAL or ubiquitous C++ and Java programming languages, the IDE has morphed into its own stand-alone computing product and now, is more akin to a document management enterprise system rather than a user interface to a hodge-podge of coding and debugging tools. To wit, central to any marketable IDE for collaborative software development is a version control system (VCS).

The modern form of the VCS stems from early "diff" programs that processed two different text files and produced a log of differences in text between the two different text files. Today, the prototypical VCS tracks differences in source code files as well as other file oriented metrics resulting from the multi-party editing of the same source code file. Further, the modern VCS permits access to any of a family of versions of the same source code file. Such operations include, by way of example, requests to access a version of a source code file that is common to two different users, a merged version of two different versions of a source code file produced by two different users, a latest or newer version of a source code file, an older ancestral version of a source code file that is common to two different users, and the like.

Managing different versions of a source code file in an IDE for multiple different developers in of itself is not sufficient to efficiently support multi-developer software development projects over the entirety of the software lifecycle. Rather, part and parcel of an effective multi-party development effort is the sharing of development data—especially compiler errors and debug messages produced by the IDE during software development. At present, conventional practice includes the "cutting and pasting" of console messages produced by the debugger of an IDE into a message to be transmitted to a co-developer. While the rudimentary sharing of the console messages no doubt can be helpful, the sharing of the console messages alone does not permit the joint experience of debugging requisite to effective software development. Rather, the mere sharing of console messages still requires the recipient of the console messages to first load the IDE, then to determine which source code files have been implicated by the console messages, to further determine an appropriate version of those source code files, and finally to load those source code files of the correct versions in the IDE.

BRIEF SUMMARY OF THE INVENTION

Embodiments of the present invention address collaborative software development improvements, and provide a novel and non-obvious method, system and computer program product for exchanging console data in a messaging system. In an embodiment of the invention, a method for exchanging console data in a messaging system includes receiving a message in a messaging client executing in memory by at least one processor of a computer. The method further includes selecting in the message in the messaging client a portion of console data for a version of source code. For instance, the console data can be a selection of source code or an error message for a selection of source code. Finally, in response to the selection of the portion of console data, corresponding meta-data for the message can be extracted and a version of source code for the console data can be determined from the meta-data. Finally, the version of the source code can be loaded in an IDE executing in the memory by the at least one processor of the computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for exchanging console data in a messaging system. In accordance with an embodiment of the invention, a portion of console data of an IDE can be selected for copying into a message in a messaging system such as an instant messenger, e-mail client and the like. The selected portion can include source code of a source code file of a specific version as managed by a VCS coupled to the IDE, or an error message produced by the IDE for source code of a source file of a specific version as managed by the VCS. Responsive to the selection of the portion of data, a line number of corresponding source code can be determined as can the specific version of the source code file. Thereafter, the line number and version can be included as meta-data to the selected portion and both the selected portion and the meta-data can be embedded in a message in the messaging system to a designated recipient, for example by way of a cut-and-paste operation.

The designated recipient, upon receipt of the message, can select the embedded portion. Responsive to the selection of the embedded portion, an IDE of the designated recipient can be loaded if not already present. Further, the meta-data can be retrieved from the message and a version of the source code file and the line number can be extracted there from. A source code file consistent with the version can be loaded into the IDE and the line number of the loaded source code file can be brought into view in the IDE. Alternatively, the designated recipient can be prompted to select a particular version of the source code file for loading and a line in the loaded source code file comparable to the line number of the meta-data can be brought into view in the IDE. In either circumstance, the collaborative effort to develop the source code of the source code file can be facilitated through the coordinated exchange of console data.

Figure 1:
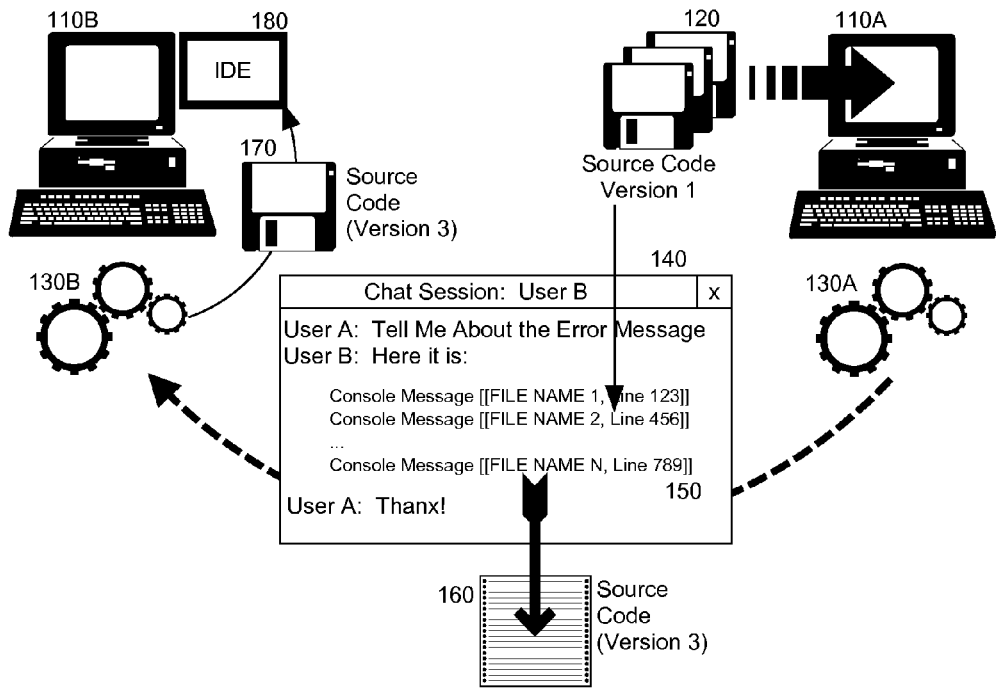
FIG. 1 is a pictorial illustration of a process for exchanging console data in a messaging system.

In further illustration, FIG. 1 shows a process for exchanging console data in a messaging system. As shown in FIG. 1, a first user 110A can edit source code in a source code file of a particular version as managed by a VCS (not shown) amongst several versions 120 of the source code file. Data 150 of the source code, such as a selection of the source code itself, or an error message produced in association with a selection of source code, can be selected for embedding in a message 140 for transmission from messaging client 130A of the first user 110A to a second user 110B by way of messaging client 130B. Of note, the data 150 can include not only a name of the source code file, but also a line number. In response, the version of the source code file along with the line number corresponding to the data 150 can be transmitted as meta-data 160 to the data 150.

Upon receipt of the message 140, the second user 110B can select the embedded data 150. In response to the selection of the data 150, the meta-data 160 can be inspected to identify a version of the source code file 120 associated with the data 150 along with the line number corresponding to the data 150. The IDE 180 for the second user 110B can be executed (if not already executing) and the second user 110B can be prompted to select the version 170 of the source code file 120 to be loaded into the IDE 180. Alternatively, the version of the source code file 120 set forth in the meta-data automatically can be loaded into the IDE 180. Regardless, a line of the version 170 of source code corresponding to that of the meta-data 160 can be brought into view of the IDE 180. Additionally, by visual inspection of the data 150 including the line number, the second user 110B in collaboration with the first user 110A can confirm whether or not both users 110A, 110B are referencing the same version of the source code file 120.

Figure 2:
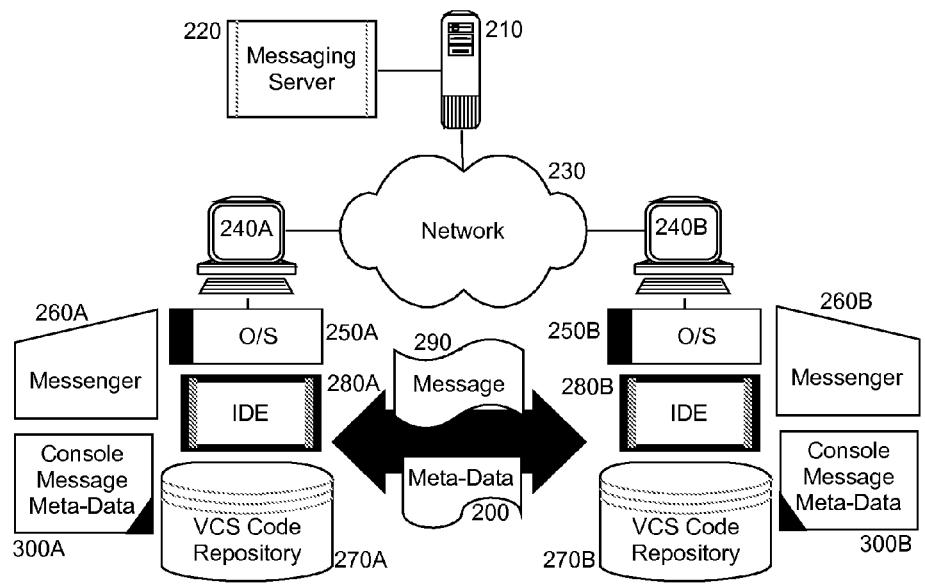
FIG. 2 is a schematic illustration of a messaging system configured for console data exchange; and, FIG. 3 is a flow chart illustrating a process for exchanging versioned console data in a messaging system.

The process described in connection with FIG. 1 can be implemented in a messaging data processing system. In yet further illustration, FIG. 2 schematically depicts a messaging system configured for console data exchange. The system can include computers 240A, 240B communicatively coupled to one another over computer communications network 230. Each of the computers 240A, 240B can include an operating system 250A, 250B hosting the operation of an IDE 280A, 280B. Each IDE 280A, 280B can be coupled to a VCS code repository 270A, 270B in which different versions of source code managed by a corresponding VCS (not shown) reside. Additionally, each of the computers 240A, 240B can include a messenger 260A, 260B configured for exchanging messages with one another over the computer communications network 230 by way of messaging server 220 operating in host 210. By way of example, the messaging server 220 can include an e-mail server, an instant messaging server, or a bulletin board system such as a forum.

Of note, console message meta-data module 300A, 300B can be coupled respectively, both to the IDE 250A, 250B and also the messenger 260A, 260B. The console message meta-data module 300A, 300B can include program code operative upon execution by at least one processor of a corresponding computer 240A, 240B to select console data provided through the IDE 250A, such as a selection of a portion of source code of a version of a source code file disposed in the VCS code repository 270A to embed the selection in a message 290, to identify both a version of the source code file and also a line number corresponding to the selection, to embed the version and line number in meta-data 200 for the message 290 and to transmit the message 290 to computer 240B through messenger 260A.

The program code of the console message meta-data module 300A, 300B yet further can be operative upon execution to select in the message 290 once received by the computer 240B in the messenger 260B the selected console data, to load in the IDE 280B a source code file corresponding to the version of source code file referenced in the meta-data 200 and to bring into view in the IDE 280B the line of the source code of the version of the source code file set forth in the meta-data 200.

Figure 3:
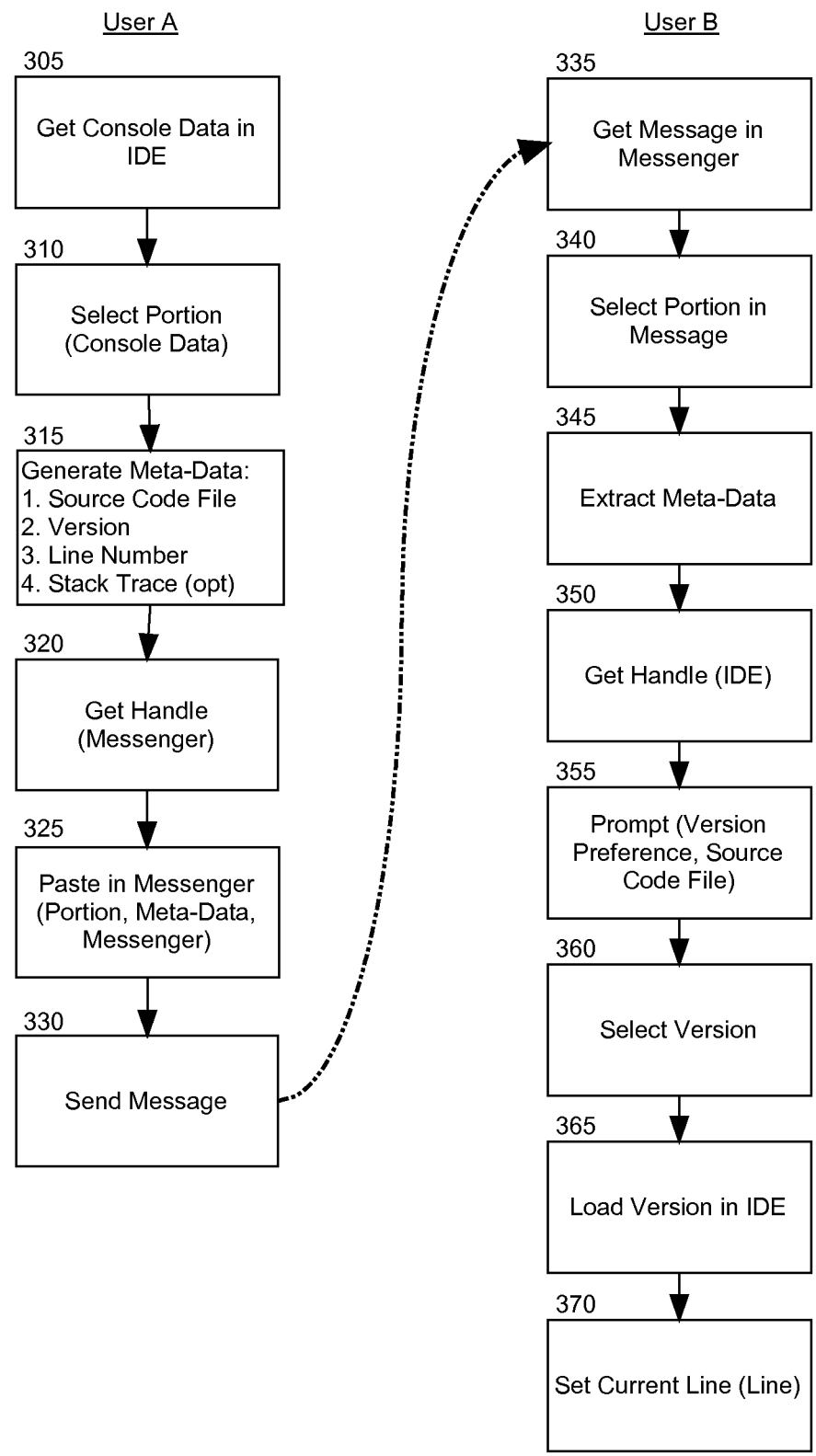

In even yet further illustration of the operation of the console message meta-data module 300A, 300B, FIG. 3 is a flow chart illustrating a process for exchanging versioned console data in a messaging system. Beginning in block 305, console data can be placed in memory, for example source code from a source code file, or one or more error messages produced by an IDE processing the source code file. In block 310, a portion of the console data can be selected and in block 315, meta-data can be generated for the selected portion, including a reference to the source code file itself, a version of the source code file, a line number of the source code associated with the selected portion, and optionally, a stack trace in the event the console data includes one or more error messages.

In block 320, a handle to a messenger client can be obtained so as to gain programmatic access to the messenger and in block 325, the selected portion of the console data can be inserted into a message in the messenger, for example by executing a cut and paste operation. Additionally, the generated meta-data can be associated with the message. Thereafter, in block 330 the message can be transmitted to a recipient. In this regard, in block 335 the message can be received by a messenger of the recipient and in block 340 the selected portion of the source code in the message can be selected. In block 345, the meta-data associated with the message can be retrieved to identify the source code file, the version of the source code file, the line number and optionally, the stack trace.

In block 350, a handle to the IDE of the recipient can be obtained. (to the extent the IDE is not loaded and executing, the IDE can be executed first). Subsequently, in block 355 the recipient can be prompted to select a version of the source code file to be loaded into the IDE based upon the version referenced in the meta-data. For instance, the recipient can be prompted to load a version of the source code file consistent with the version of the meta-data, a newest version of the source code file if no merge conflicts exists with the version of the source code file referenced by the meta-data, an older version of the source code file than that referenced by the meta-data, a newer version of the source code file notwithstanding any merge conflicts with the version of the source code file referenced by the meta-data, or an earliest common ancestor of the source code file before that referenced by the meta-data. In block 360, the recipient can select a desired version of the source code file and in block 365 the selected version can be loaded in IDE. Finally, in block 370 a line of the version of the source code in the IDE corresponding to the line of the meta-data can be brought into view.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for exchanging console data in a messaging system, the method comprising:
   receiving a message in a messaging client executing in memory by at least one processor of a computer;
   selecting in the received message in the messaging client a portion of console data for a version of source code, the portion of console data including data displayed in connection with source code in a console of an integrated development environment (IDE); and,
   responsive to the selection of the portion of console data:
      extracting corresponding meta-data for the received message,
      determining a version of source code for the console data from the meta-data,
      prompting for a selection of a version of source code relative to the determined version, and
      loading the selected version of the source code in the IDE executing in the memory by the at least one processor of the computer.

2. The method of claim 1, wherein the console data is a selection of source code.

3. The method of claim 1, wherein the console data is an error message for a selection of source code.

4. The method of claim 1, further comprising:
   determining a line number for the portion of console data from the meta-data; and,
   bringing into view in the IDE a line of the loaded version of source code corresponding to the determined line number.

5. A messaging system configured for console data exchange, the system comprising:
   a computer with at least one processor and memory;
   a messaging client and an integrated development environment (IDE) executing in the computer;
   a version control system (VCS) coupled to the IDE and a repository of different versions of source code; and,
   a console message meta-data module executing in the computer and coupled to both the messenger and the IDE, the console message meta-data module comprising program code operative to respond to a selection of a portion of console data that includes data displayed in connection with source code in a console of the IDE in a message received in the messaging client by:
      extracting corresponding meta-data for the message,
      determining a version of source code for the console data from the meta-data,
      prompting for a selection of a version of source code relative to the determined version, and
      loading the selected version of source code in the IDE.

6. The system of claim 5, wherein the console data is a selection of source code.

7. The system of claim 5, wherein the console data is an error message for a selection of source code.

8. The system of claim 5, wherein the program code of the module is further operative to respond to the selection of the portion of console data in the message received in the messaging client by:
   determining a line number for the portion of console data from the meta-data; and,
   bringing into view in the IDE a line of the loaded version of source code corresponding the determined line number.

9. A computer program product for exchanging console data in a messaging system, the computer program product comprising:
   a computer readable storage memory having computer readable program code embodied therewith, the computer readable program code comprising:
      computer readable program code for receiving a message in a messaging client executing in memory by at least one processor of a computer;
      computer readable program code for selecting in the received message in the messaging client a portion of console data for a version of source code, the portion of console data including data displayed in connection with source code in a console of an integrated development environment (IDE); and,
      computer readable program code for responsive to the selection of the portion of console data:
      extracting corresponding meta-data for the received message,
      determining a version of source code for the console data from the meta-data,
      prompting for a selection of a version of source code relative to the determined version, and
      loading the selected version of source code in the IDE executing in the memory by the at least one processor of the computer.

10. The computer program product of claim 9, wherein the console data is a selection of source code.

11. The computer program product of claim 9, wherein the console data is an error message for a selection of source code.

12. The computer program product of claim 9, further comprising:
   computer readable program code for determining a line number for the portion of console data from the meta-data; and,
   computer readable program code for bringing into view in the IDE a line of the loaded version of source code corresponding to the determined line number.

* * * * *